United States Patent
Kim

[11] Patent Number: 5,831,949
[45] Date of Patent: Nov. 3, 1998

[54] DIGITAL FOCUS SERVO CONTROL APPARATUS FOR USE IN AN OPTICAL DISK SYSTEM

[75] Inventor: Goon-Jin Kim, Seoul, Rep. of Korea

[73] Assignee: Daewoo Electronics Co., Ltd., Seoul, Rep. of Korea

[21] Appl. No.: 844,118

[22] Filed: Apr. 29, 1997

[30] Foreign Application Priority Data

Apr. 30, 1996 [KR] Rep. of Korea .................. 1996 13754

[51] Int. Cl.$^6$ ....................................................... G11B 7/09
[52] U.S. Cl. .................................. 369/44.35; 369/44.25; 369/44.29; 369/44.32
[58] Field of Search .............................. 369/44.25, 44.29, 369/44.32, 44.34, 44.35, 44.41, 54

[56] References Cited

U.S. PATENT DOCUMENTS

| | | | |
|---|---|---|---|
| 4,817,077 | 3/1989 | Ono ....................................... | 369/44.32 |
| 5,189,293 | 2/1993 | Leenknegt .............................. | 369/44.41 |
| 5,623,465 | 4/1997 | Sasaki et al. .......................... | 369/44.32 |

*Primary Examiner*—Thang V. Tran
*Attorney, Agent, or Firm*—Anderson, Kill & Olick, P.C.

[57] ABSTRACT

An apparatus efficiently compensates a focus error signal detected by a focus error detector in an optical disk system using an improved focus error compensation scheme. At an optical head, light reflected from a data recording surface of an optical disk is received, wherein the light from a light source is first focussed on the data recording surface of the optical disk before it is reflected therefrom, and converted into an electrical signal. At the focus error detector, the focus error (FE) signal is detected from the electrical signal. Next, at a controller, a regenerative information (RF) signal from the optical head is received and a selection signal is derived based on both a magnitude of the FE signal and a power level of the RF signal. Finally, at a filtering unit, in response to the selection signal, for selecting one of N predetermined filtering units, one of them having a very small cutoff frequency and the remainder of the filtering units having predetermined different phase-crossover frequencies, respectively, and filtering the FE signal by using the selected filtering unit to issue a filtered signal to the optical head as a compensated signal, thereby controlling focussing of the light along an optical axis formed by a center point of the light source and a convergence point of the light on the data recording surface of the optical disk, wherein N is a positive integer larger than 1.

17 Claims, 1 Drawing Sheet

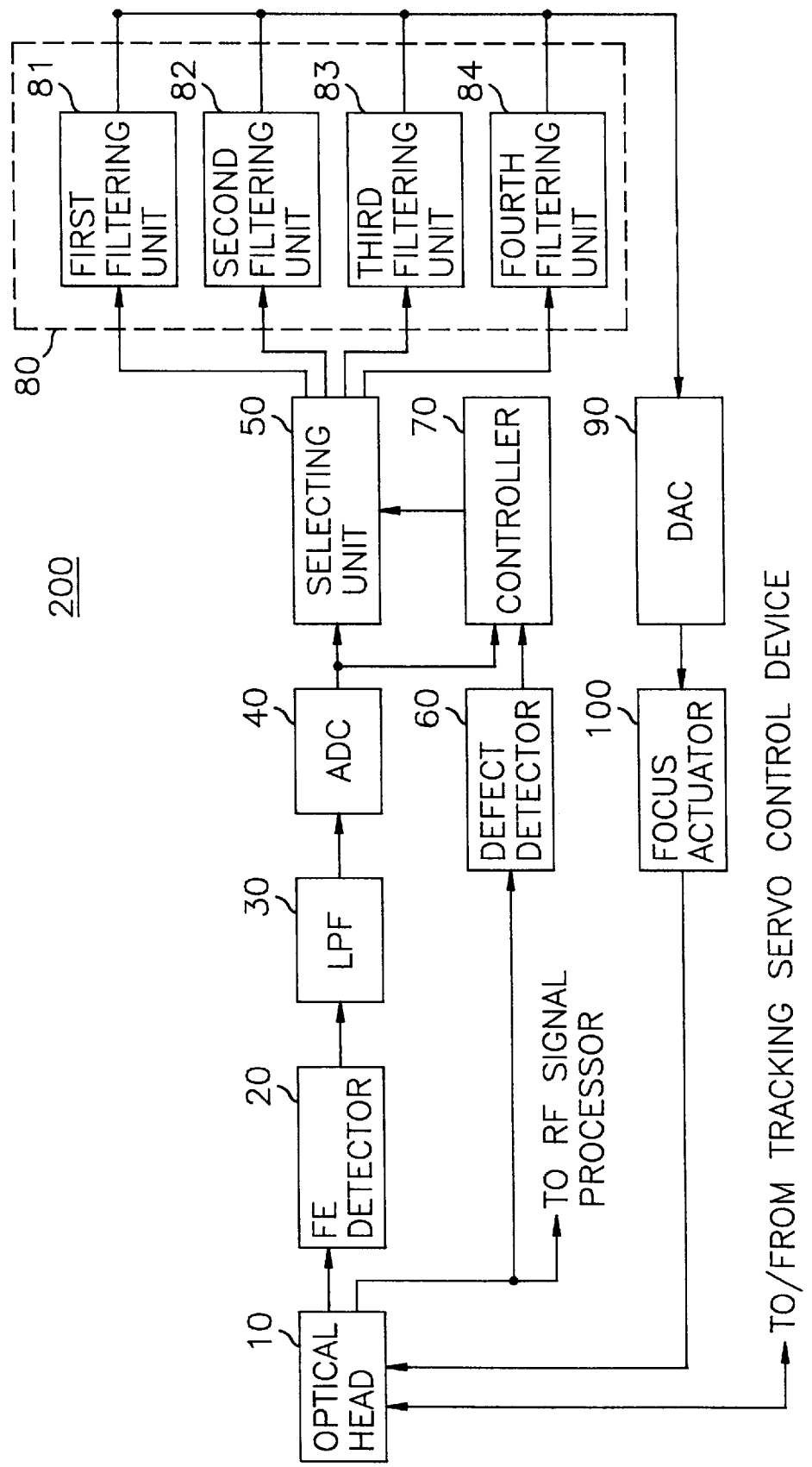

DIGITAL FOCUS SERVO CONTROL APPARATUS FOR USE IN AN OPTICAL DISK SYSTEM

FIELD OF THE INVENTION

The present invention relates to an optical disk system; and, more particularly, to a digital focus servo control apparatus, for use in the optical disk system, for effectively compensating focus errors by employing an improved focus error compensation technique.

BACKGROUND OF THE INVENTION

As is well known, a conventional optical disk system is provided with a digital servo control device which enables an optical head or optical system to have a precise access to each of tracks formed on a data recording surface of an optical disk. In general, such a digital servo control device comprises an optical disk, an optical head having a light source, a focus servo control loop having a focus error (FE) detector and a focus actuator, and a tracking servo control loop having a tracking error (TE) detector and a tracking actuator. The focus and the tracking servo control loops further have an FE compensation unit and a TE compensation unit for compensating an FE and a TE signals detected by the FE and the TE detectors, respectively.

Specifically, in the focus servo control loop, when the optical head reads information from the optical disk, the optical head is controlled by the FE compensation unit as follows.

First of all, the FE compensation unit receives a regenerative information (RF) signal provided from the optical head to compensate an FE signal detected by the FE detector. And then, using the RF signal received, the FE compensation unit derives a filter selection signal to select one of two filters, a first and a second filters, contained therein, the former being a digital filter such as an infinite impulse response (IIR) filter having three predetermined phase-crossover frequencies and the latter being a common low pass filter having a very small cutoff frequency. Conventionally, the filter selection signal is derived based on whether or not there exists a defect such as a scratch, fingerprint, black dot or the like on a target track of the tracks formed on the data recording surface of the optical disk, wherein the target track represents a track on which the light from a light source is being focussed to retrieve information therefrom. Such a defect can be detected by comparing a power level of the RF signal with a predetermined threshold value. For instance, if the power level of the RF signal is smaller than the threshold value, at the FE compensation unit, it is decided that the defect as mentioned above is detected on the target track and then the filter selection signal of a logic high level is issued; and if otherwise, it is decided that no defect is detected thereon and the filter selection signal of a logic low level is produced.

In response to the filter selection signal of the logic low level, the first filter having the three phase-crossover frequencies of predetermined values is selected from the two filters and is utilized for filtering the FE signal; and in response to the filter selection signal of the logic high level, the second filter having the very small cutoff frequency is selected and is used for filtering the FE signal. Finally, the FE signal filtered by one of the two filters is applied to the focus actuator to drive the optical head so that the light from the light source can be focussed along the target track on the data recording surface of the optical disk.

However, in the conventional FE compensation method, the filter selection signal used to select one of the filters is determined based on only a power level of the RF signal regardless of the magnitude of the FE signal, and thus it may not provide a satisfactory FE compensation in case an overshoot in FE signal takes place abruptly, thereby deteriorating picture quality.

SUMMARY OF THE INVENTION

It is, therefore, a primary object of the present invention to provide a digital focus servo control apparatus, for use in an optical disk system, capable of compensating an FE signal based on both a power level of an RF signal and a magnitude of the FE signal to thereby improve the quality of a video signal from the system.

In accordance with the invention, there is provided a digital focus servo control apparatus for use in an optical disk system, which comprises:

an optical head for receiving light reflected from a data recording surface of an optical disk, wherein the light from a light source is first focussed on the data recording surface of the optical disk before it is reflected therefrom, and converting the light received into an electrical signal;

means for detecting a focus error (FE) signal from the electrical signal;

means for receiving a regenerative information (RF) signal from the optical head and deriving a selection signal based on both a magnitude of the FE signal and a power level of the RF signal; and filtering means, in response to the selection signal, for selecting one of N predetermined filtering units, one of them having a very small cutoff frequency and the remainder of the filtering units having predetermined different phase-crossover frequencies, respectively, and filtering the FE signal by using the selected filtering unit to issue a filtered signal to the optical head, thereby controlling focussing of the light along an optical axis formed by a center point of the light source and a convergence point of the light on the data recording surface of the optical disk, wherein N is a positive integer larger than 1.

BRIEF DESCRIPTION OF THE DRAWING

The above and other objects and features of the present invention will become apparent from the following description of preferred embodiments given with respect to the accompanying drawing, which is a functional block diagram in accordance with the present invention illustrating a novel digital focus servo control apparatus for use in an optical disk system.

DETAILED DESCRIPTION OF THE PREFERRED EMBODIMENTS

Referring to the drawing, there is depicted a block diagram of a digital focus servo control apparatus 200 of the present invention for use in an optical disk system (not shown). The inventive apparatus 200 comprises an optical head 10, an FE detector 20, a low pass filter (LPF) 30, an analog to digital converter (ADC) 40, a selecting unit 50, a defect detector 60, a controller 70, an FE compensator 80, a digital to analog converter (DAC) 90 and a focus actuator 100.

When information is reproduced by the optical head 10 from an optical disk (not shown), the optical head 10 is servo-controlled through the use of a conventional tracking servo control method and a novel digital focus servo control scheme in accordance with the invention which will be explained in detail below. Through such a servo control, the light from a light source (not shown) in the optical head 10 can be precisely focussed along each of tracks on the optical disk by moving the optical head 10 along said each track based on the TE signal from a TE detector in a tracking servo control device (not shown) and the FE signal from the FE detector 20. For the sake of simplicity, a detailed description of the tracking servo control device is omitted here since it is well known in the art.

Specifically, the optical head 10 first receives light reflected from the optical disk, wherein the light is first focussed along a target track of the tracks formed on a data recording surface of the optical disk before it is reflected therefrom, and converts the light received into a first and a second sets of electrical signals, wherein the target track represents a track on which the light from the light source is being focussed. Further, the head 10 derives a third set of electrical signals and then generates an RF signal by using the third set of electrical signals. In the conversion and generation operations, a plurality of, e.g., 4, photodiodes well known in the art may be advantageously utilized. The first and the second sets of electrical signals are transferred to the FE detector 20 and the tracking servo control device, respectively, while the RF signal is applied to the defect detector 60 and an RF signal processor (not shown). For the sake of simplicity, details of the RF signal processor are omitted here since they are well known in the art.

At the FE detector 20, based on the first set of electrical signals from the optical head 10, an FE signal is detected by using one of conventional FE signal detection algorithms. Thereafter, the detected FE signal is provided to the LPF 30 which filters the FE signal applied thereto with a predetermined cutoff frequency, thereby sending the filtered FE signal to the ADC 40. At the ADC 40, as is well known in the art, the filtered FE signal from the LPF 30 is converted into a digital FE signal to provide same to the selecting unit 50 and the controller 70.

In the meantime, at the defect detector 60 it is decided whether or not there exists a defect such as a scratch, fingerprint, black dot or the like on the target track of the data recording surface of the optical disk. Such a defect can be detected by comparing a power level of the RF signal from the optical head 10 with a first predetermined threshold value TH1, wherein TH1 is a predetermined real number. For instance, if the power level is smaller than TH1, it is decided at the defect detector 60 that the defect as defined above is detected on the target track and then disk status information DSI of logic high level is generated. On the other hand, if the power level is equal to or larger than TH1, it is determined at the defect detector 60 that there is no defect detected on the target track and then disk status information DSI of logic low level is produced. Subsequently, the disk status information DSI of logic high or logic low level is provided to the controller 70.

Inputs to the controller 70 are the digital FE signal from the ADC 40 and the disk status information DSS from the defect detector 60. Based on the two inputs, the controller 70 derives a filtering unit selection signal FUSS to be used to select one of a multiplicity of, e.g., 4, filtering units, 81 to 84, included in the FE compensator 80. More specifically, the controller 70 first detects the track variations in perpendicular direction to the data recording surface along the target track and compares the digital FE signal with a second and a third predetermined threshold values TH2 and TH3, respectively, wherein the second and the third threshold values TH2 and TH3 are predetermined real numbers, respectively, and satisfy a relationship of TH3>TH2.

In one of preferred embodiments of the invention, the controller 70 selectively outputs the filtering unit selection signal FUSS of a first, a second, a third or a fourth type value based on the comparison result obtained above and the disk status information DSI. For instance, if the disk status information DSI has a logic low level meaning that no defect is found on the target track of the data recording surface of the optical disk and the digital FE signal is smaller than TH2, the controller 70 outputs the filtering unit selection signal FUSS of the first type value. If the disk status information DSI has the logic low level and the digital FE signal is larger than TH3 representing that the track variations in perpendicular direction to the data recording surface along the target track is very large, the controller 70 issues the filtering unit selection signal FUSS of the second type value. If the disk status information DSI has the logic low level and the digital FE signal is between TH2 and TH3, the controller 70 issues the filtering unit selection signal FUSS of the third type value. Finally, if the defect as described above is detected on the target track, i.e., if the disk status information DSI has a logic high level, the controller 70 generates the filtering unit selection signal FUSS of the fourth type value, regardless of the magnitude of the digital FE signal. In another embodiment of the present invention, the filtering unit selection signal may be obtained by receiving the FE signal M times and using an average value of the FE signals, wherein use has been made of a storage device such as a memory and an average value calculator well known in the art, M being a positive integer. Subsequently, the filtering unit selection signal FUSS of the first, the second, the third or the fourth type value obtained by the controller 70 is provided to the selecting unit 50.

In response to the filtering unit selection signal FUSS from the controller 70, the selecting unit 50 selectively couples the digital FE signal from the ADC 40 to one of the four filtering units 81 to 84. Specifically, in accordance with the present invention, the selecting unit 50 couples the digital FE signal to the first filtering unit 81 in response to the filtering unit selection signal of the first type value, to the second filtering unit 82 in response to the filtering unit selection signal of the second type value, to the third filtering unit 83 in response to the filtering unit selection signal of the third type value, and to the fourth filtering unit 84 in response to the filtering unit selection signal of the fourth type value.

Each of the three filtering units 81 to 83 has two or more cascaded digital filters, e.g., infinite impulse response (IIR) filters (not shown), well known in the art; has three predetermined different phase-crossover frequencies, whereas the remainder of the filtering units, i.e., 84, is one of low pass filters commonly known in the art having a very small cutoff frequency $f_c$. For the sake of simplicity, there is illustrated only one phase-crossover frequency having medium value among them in each of the three filtering units, e.g., $W1_c$ in the first filtering unit 81, $W2_c$ in the second filtering unit 82 and $W3_c$ in the third filtering unit 83, the three frequencies having a relationship of $W1_c < W3_c < W2_c$.

In accordance with the invention, the first filtering unit 81 is designed in such a manner that the values of the phase lag and lead elements are close to each other and set to have the characteristics of the frequency $W1_c$. The second filtering unit 82 is designed such that the phase lag element is much larger than the phase lead element and set to have the characteristics of the frequency $W2_c$. The third filtering unit 83 is designed so that the phase lag element is larger than the phase lead element to have the characteristics of the frequency $W3_c$. Finally, the fourth filtering unit 84 is designed to have the characteristics of the frequency $f_c$. Each filtering unit so designed filters the digital FE signal provided from the ADC 40 through the selecting unit 50 and outputs the filtered digital signal to the DAC 90 as a compensated digital signal.

At the DAC 90, the compensated digital signal is converted into a compensated analog signal and then relayed to the focus actuator 100. In response to the compensated analog signal from the DAC 90, as is well known in the art, the focus actuator 100 drives the optical head 10, thereby rendering the light from the light source to be focussed along the target track on the data recording surface of the optical disk.

As can be seen from the above, in case no defect is detected on the target track and the digital FE signal is smaller than TH2, the digital FE signal is filtered by the first filtering unit 81 with the phase-crossover frequency $W1_c$ and thereafter applied via the DAC 90 to the focus actuator 100 to drive the optical head 10, thereby making the light from the light source to be stably focused along the target track. In case no defect is found on the target track and the digital FE signal is larger than TH3, the digital FE signal is filtered by the second filtering unit 82 with the phase-crossover frequency $W2_c$ to considerably decrease the magnitude thereof and then transferred via the DAC 90 to the focus actuator 100, thereby enabling the optical head 10 to have a rapid access to the target track. In case there is no defect detected on the target track and the FE signal is between TH2 and TH3, the digital FE signal is filtered by the third filtering unit 83 with the phase-crossover frequency $W3_c$ to lower the magnitude thereof and then is provided via the DAC 90 to the focus actuator 100, thereby making the optical head 10 have a rapid access to the target track. Finally, in case the defect is found on the target track, the digital FE signal is completely blocked by the fourth filtering unit 84 with the very small cutoff frequency $f_c$, irrespective of the magnitude of the FE signal; and, in this case, no signal is applied from the fourth filtering unit 84 to the focus actuator 100, thereby rendering the optical head 10 unresponsive to the digital FE signal from the selecting unit 50. As is well known in the art, in such a case, data interpolation is performed by a signal processing device (not shown) using a conventional data interpolation scheme. Even though FE compensation concerning only one track is illustratively explained here for the sake of simplicity, it should be appreciated that FE compensations regarding other tracks can be done by using a same FE compensation method as fully discussed above. As a result, the present invention is capable of efficiently compensating an FE signal detected by an FE detector by employing both a power level of an RF signal from an optical head and magnitude of the FE signal to thereby improve picture quality.

While the present invention has been shown and described with respect to the particular embodiment, it will be apparent to those skilled in the art that many changes and modifications may be made without departing from the spirit and scope of the invention as defined in the appended claims.

What is claimed is:

1. A digital focus servo control apparatus for use in an optical disk system, which comprises:
    an optical head for receiving light reflected from a data recording surface of an optical disk, wherein the light from a light source is first focussed on the data recording surface of the optical disk before it is reflected therefrom, and converting the light received into an electrical signal;
    means for detecting a focus error (FE) signal from the electrical signal;
    control means for receiving a regenerative information (RF) signal from the optical head and deriving a selection signal based on both a magnitude of the FE signal and a power level of the RF signal; and
    filtering means, in response to the selection signal, for selecting one of N predetermined filtering units, one of them having a very small cutoff frequency $f_c$ and the remainder of the filtering units having predetermined different phase-crossover frequencies, respectively, and filtering the FE signal by using the selected filtering unit to issue a filtered FE signal to the optical head as a compensated signal, thereby controlling focussing of the light along an optical axis formed by a center point of the light source and a convergence point of the light on the data recording surface of the optical disk, wherein N is a positive integer larger than 1.

2. The digital focus servo control apparatus of claim 1, wherein the selection signal has a first type value if the power level of the RF signal is equal to or greater than a first predetermined threshold value TH1 meaning that no defect is detected on the data recording surface of the optical disk and the magnitude of the FE signal is smaller than a second predetermined threshold value TH2, a second type value if the power level of the RF signal is equal to or greater than the first threshold value TH1 and the magnitude of FE signal is greater than a third predetermined threshold value TH3, a third type value if the power level of the RF signal is equal to or greater than the first threshold value TH1 and the magnitude of the FE signal is between the second and the third threshold values TH2 and TH3, and a fourth type value if the power level of the RF signal is smaller than the first threshold value TH1 indicating that a defect is found on the data recording surface, regardless of the magnitude of the FE signal, the threshold values TH2 and TH3 being predetermined real numbers, respectively, satisfying a relationship of TH3>TH2 and the threshold value TH1 being a predetermined real number.

3. The digital focus servo control apparatus of claim 2, wherein the control means includes:
    means for receiving M FE signals and processing them, to thereby output an average value of the M FE signals, M being a positive integer; and
    means for generating the selection signal by using the average value of the M FE signals and the RF signal.

4. The digital focus servo control apparatus of claim 3, wherein the control means further includes a storage means for storing M number of FE signals.

5. The digital focus servo control apparatus of claim 1, further comprising means for driving the optical head in response to the compensated signal provided from one of the filtering units.

6. The digital focus servo control apparatus of claim 2, wherein N is 4.

7. The digital focus servo control apparatus of claim 6, wherein a first filtering unit is a low pass filter having the very small cutoff frequency $f_c$, and a second, a third and a fourth filtering units, each having two or more cascaded infinite impulse response digital filters, have three predetermined phase-crossover frequencies, respectively, wherein a predetermined phase-crossover frequency $W3_c$ having a medium value among the three phase-crossover frequencies in the third filtering unit is larger than a predetermined phase-crossover frequency $W1_c$ of the first filtering unit but smaller than a predetermined phase-crossover frequency $W2_c$ of the second filtering unit.

8. The digital focus servo control apparatus of claim 7, wherein the first filtering unit is selected in response to the selection signal of the fourth type value, the second filtering unit is chosen in response to the selection signal of the first type value, the third filtering unit is selected in response to the selection signal of the second type value, and the fourth filtering unit is chosen in response to the selection signal of the third type value.

9. A digital focus servo control apparatus for use in an optical disk system, which comprises:

an optical head for receiving light reflected from a target track on a data recording surface of an optical disk, wherein the light from a light source is first focussed on the target track before it is reflected therefrom, and converting the light received into an electrical signal;

means for detecting a focus error (FE) signal from the electrical signal;

control means for receiving a regenerative information (RF) signal from the optical head and deriving a selection signal based on both a magnitude of the FE signal and a power level of the RF signal; and filtering means, in response to the selection signal, for selecting one of N predetermined filtering units, one of them having a very small cutoff frequency $f_c$ and the remainder of the filtering units having predetermined different phase-crossover frequencies, respectively, and filtering the FE signal by using the selected filtering unit to issue a filtered FE signal to the optical head as a compensated signal, thereby controlling focussing of the light along an optical axis formed by a center point of the light source and a convergence point of the light on the target track, wherein N is a positive integer larger than 1.

10. The digital focus servo control apparatus of claim 9, wherein the selection signal has a first type value if the power level of the RF signal is equal to or greater than a first predetermined threshold value TH1 meaning that no defect is detected on the target track and the magnitude of the FE signal is smaller than a second predetermined threshold value TH2, a second type value if the power level of the RF signal is equal to or greater than the first threshold value TH1 and the magnitude of FE signal is greater than a third predetermined threshold value TH3, a third type value if the power level of the RF signal is equal to or greater than the first threshold value TH1 and the magnitude of the FE signal is between the second and the third threshold values TH2 and TH3, and a fourth type value if the power level of the RF signal is smaller than the first threshold value TH1 indicating that a defect is found on the target track, regardless of the magnitude of the FE signal, the threshold values TH2 and TH3 being predetermined real numbers, respectively, satisfying a relationship of TH3>TH2 and the threshold value TH1 being a predetermined real number.

11. The digital focus servo control apparatus of claim 10, wherein the control means includes:

means for receiving M FE signals and processing them, to thereby output an average value of the M FE signals, M being a positive integer; and means for generating the selection signal by using the average value of the M FE signals and the RF signal.

12. The digital focus servo control apparatus of claim 11, wherein the control means further includes a storage means for storing M number of FE signals.

13. The digital focus servo control apparatus of claim 10, wherein N is 4.

14. The digital focus servo control apparatus of claim 13, wherein a first filtering unit which is one of the four filtering units is a low pass filter having a very small cutoff frequency $f_c$, and a second, a third and a fourth filtering units which are the remainder of the units have two or more cascaded infinite impulse response digital filters having the predetermined phase-crossover frequencies, respectively, wherein a predetermined phase-crossover frequency $W3_c$ having a medium value among the three phase-crossover frequencies in the third filtering unit is larger than a predetermined phase-crossover frequency $W1_c$ of the first filtering unit but smaller than a predetermined phase-crossover frequency $W2_c$ of the second filtering unit.

15. The digital focus servo control apparatus of claim 14, wherein the first filtering unit is selected in response to the selection signal of the fourth type value, the second filtering unit is chosen in response to the selection signal of the first type value, the third filtering unit is selected in response to the selection signal of the second type value, and the fourth filtering unit is chosen in response to the selection signal of the third type value.

16. The digital focus servo control apparatus of claim 9, further comprising means for driving the optical head in response to the compensated signal provided from one of the filtering units.

17. The digital focus servo control apparatus of claim 9, wherein the optical head includes means for receiving light reflected from a next track, wherein the light from the light source is first focussed on the next target track before it is reflected therefrom, and converting the light received into an electrical signal until compensations of FE signals regarding all of tracks on the data recording surface of the optical disk have been completed.

\* \* \* \* \*

UNITED STATES PATENT AND TRADEMARK OFFICE

CERTIFICATE OF CORRECTION

PATENT NO.    : 5,831,949
DATED         : November 3, 1998
INVENTOR(S)   : Goon-Jin Kim It is certified that error appears in the above-identified patent and that said Letters Patent is hereby corrected as shown below:

On the title page, item,

[30]   Foreign Application Priority Data

Apr. 30, 1996   [KR]   Rep. of Korea          96-13754

Signed and Sealed this

Twenty-third Day of February, 1999

Attest:

Q. TODD DICKINSON

*Attesting Officer*             *Acting Commissioner of Patents and Trademarks*